(12) United States Patent
Hoenes

(10) Patent No.: US 10,718,726 B2
(45) Date of Patent: *Jul. 21, 2020

(54) METHOD FOR DETERMINING THE CONCENTRATION OF AN ELEMENT OF A HETEROEPITAXIAL LAYER

(71) Applicant: Infineon Technologies Austria AG, Villach (AT)

(72) Inventor: Katja Hoenes, Villach (AT)

(73) Assignee: Infineon Technologies Austria AG, Villach (AT)

( * ) Notice: Subject to any disclaimer, the term of this patent is extended or adjusted under 35 U.S.C. 154(b) by 239 days.

This patent is subject to a terminal disclaimer.

(21) Appl. No.: 15/783,600

(22) Filed: Oct. 13, 2017

(65) Prior Publication Data

US 2019/0113468 A1    Apr. 18, 2019

(51) Int. Cl.
*G01N 23/207* (2018.01)
*G01N 23/20* (2018.01)
*G01N 23/20008* (2018.01)

(52) U.S. Cl.
CPC .......... *G01N 23/207* (2013.01); *G01N 23/20* (2013.01); *G01N 23/20008* (2013.01); *G01N 2223/0561* (2013.01); *G01N 2223/6116* (2013.01)

(58) Field of Classification Search
CPC .................. G01N 23/207; G01N 23/20; G01N 23/20008; G01N 2223/0561; G01N 2223/6116

(Continued)

(56) References Cited

U.S. PATENT DOCUMENTS 6,999,557 B2 *  2/2006  Yamaguchi ............ G01N 23/20
                                                                378/71
7,769,134 B1    8/2010  Adam et al.
(Continued)

FOREIGN PATENT DOCUMENTS

EP          1571441 A1     9/2005

OTHER PUBLICATIONS

"X-ray thin-film measurement techniques —High resolution X-ray diffractometry", The Rigaku Journal, vol. 25, No. 2, 2009, pp. 1-8.
(Continued)

*Primary Examiner* — Taeho Jo
(74) *Attorney, Agent, or Firm* — Murphy, Bilak & Homiller, PLLC

(57) ABSTRACT

In an embodiment, a method for determining the concentration of an element of a heteroepitaxial layer includes generating a reciprocal space map in $Q_z$ and $Q_x$ directions in a portion of reciprocal space describing positions of diffracted X-ray peaks of a heteroepitaxial layer and of a substrate on which the heteroepitaxial layer is positioned, determining the position of a diffracted X-ray peak of the substrate in the reciprocal space map in the $Q_x$ direction, determining the expected position of the diffracted X-ray peak of the heteroepitaxial layer in the $Q_x$ direction based on the determined position of the diffracted X-ray peak of the substrate in the $Q_x$ direction, generating a scan of the heteroepitaxial layer in a $Q_z$ direction at the expected position in the $Q_x$ direction, and determining the concentration of a constituent element of the heteroepitaxial layer based on the scan.

13 Claims, 10 Drawing Sheets

(58) Field of Classification Search
USPC .......................................................... 378/73
See application file for complete search history.

(56) References Cited

U.S. PATENT DOCUMENTS

| | | | | |
|---|---|---|---|---|
| 2004/0240611 | A1* | 12/2004 | Yamaguchi | G01N 23/20 378/71 |
| 2005/0195941 | A1* | 9/2005 | Lischka | C30B 25/16 378/71 |
| 2006/0163612 | A1* | 7/2006 | Kouvetakis | H01L 21/02381 257/201 |
| 2008/0187768 | A1* | 8/2008 | Kouvetakis | C23C 16/0272 428/450 |
| 2010/0072515 | A1* | 3/2010 | Park | H01L 21/02494 257/190 |
| 2011/0127544 | A1* | 6/2011 | Paskova | C30B 25/20 257/77 |
| 2011/0164730 | A1* | 7/2011 | Yokhin | G01N 23/207 378/73 |
| 2011/0198729 | A1* | 8/2011 | Kouvetakis | H01L 21/02381 257/616 |
| 2011/0254052 | A1* | 10/2011 | Kouvetakis | H01L 21/02381 257/190 |
| 2012/0140889 | A1* | 6/2012 | Wall | G01N 23/207 378/73 |
| 2012/0146050 | A1 | 6/2012 | Adam et al. | |
| 2012/0235161 | A1* | 9/2012 | Paskova | C30B 25/20 257/76 |
| 2012/0281814 | A1* | 11/2012 | Yokhin | G01N 23/207 378/73 |
| 2015/0179968 | A1* | 6/2015 | Forrest | C30B 23/02 257/40 |
| 2016/0203972 | A1* | 7/2016 | Sundaram | H01L 21/3245 257/76 |
| 2016/0380144 | A1* | 12/2016 | Chaudhari | H01L 31/18 438/71 |
| 2017/0133222 | A1* | 5/2017 | Park | H01L 21/02494 |
| 2017/0213718 | A1* | 7/2017 | Sundaram | C30B 25/02 |
| 2017/0343491 | A1 | 11/2017 | Borna et al. | |
| 2018/0358457 | A1* | 12/2018 | Janzen | H01L 21/02458 |
| 2018/0366325 | A1* | 12/2018 | Norman | H01L 21/02485 |

OTHER PUBLICATIONS

Kidd, P., "XRD of gallium nitride and related compounds: strain, composition and layer thickness", PANalytical, Dec. 17, 2013, retrieved online at https://www.malvernpanalytical.com/en/learn/knowledge-center/booklets/WP180831GaNBooklet.html on Mar. 13, 2019.

Vickers, M. E., et al., "Determination of the composition and thickness of semi-polar and non-polar III-nitride films and quantum wells using X-ray scattering", Journal of Applied Physics 111, 2012.

Wie, Chu Ryang, "High resolution X-ray diffraction characterization of semiconductor structures", Materials Science and Engineering R13, 1994, pp. 1-56.

Zhou, Sheng-Qiang, et al., "Determination of Al Composition in Strained AlGaN Layers", Chinese Physics Letters, vol. 22, No. 12, Dec. 2005, pp. 3189-3191.

* cited by examiner a... ω/2Θ scan direction
b... ω scan direction
c... 2Θ scan direction
• Si, cubic
✦ Ge, cubic

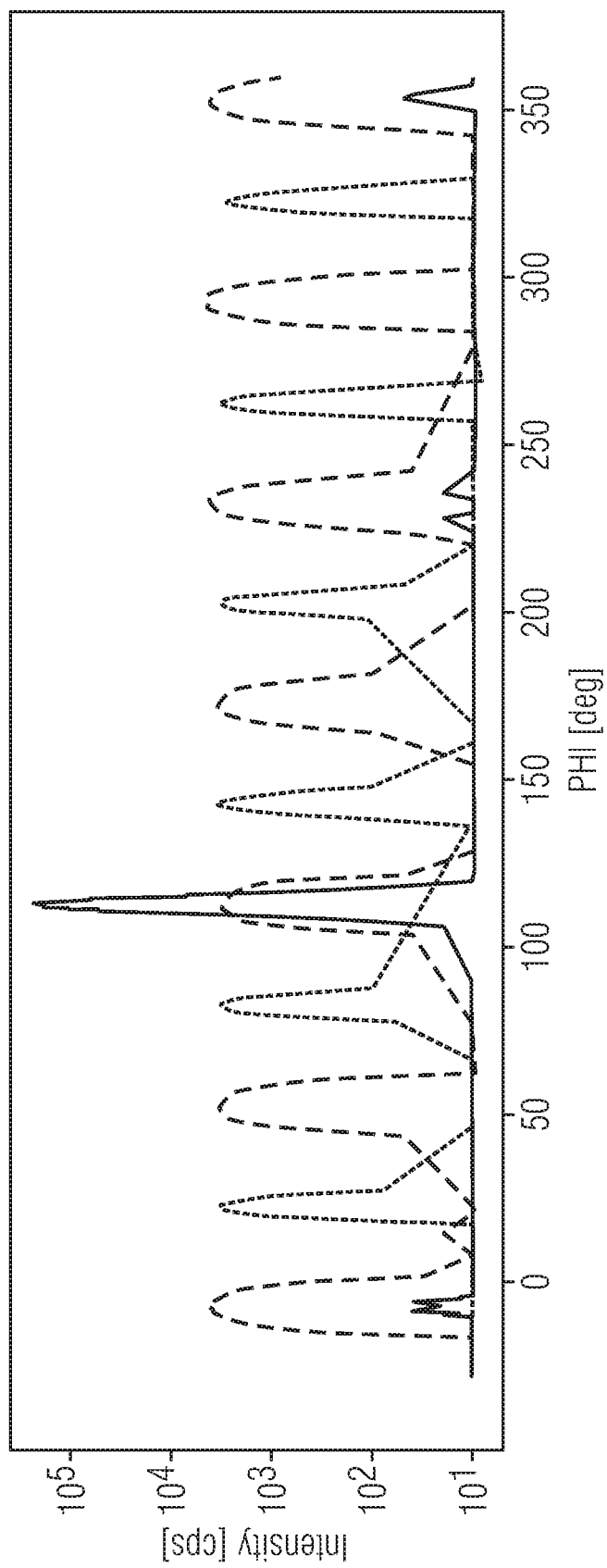

METHOD FOR DETERMINING THE CONCENTRATION OF AN ELEMENT OF A HETEROEPITAXIAL LAYER

BACKGROUND

The GaN/Al$_x$Ga$_{(1-x)}$N HEMT (High Electron Mobility Transistor) concept is based on the formation of a 2-dimensional electron gas (2DEG) at the interface between GaN and Al$_x$Ga$_{(1-x)}$N. In general, for the formation of a 2DEG, two semiconductor materials with similar lattice constants but different band gaps are needed. At the interface between the two semiconductors e.g. GaN and Al$_x$Ga$_{(1-x)}$N, due to the different band gaps, there is a band bending phenomenon in which the conduction band energy minimum line (CB) of the large band gap semiconductor (e.g. AlGaN) is bent upwards, while the CB of the smaller band gap semiconductor (e.g. Al$_x$Ga$_{(1-x)}$N) is bent downwards. This phenomenon leads to the formation of a triangular potential well at the interface. If the minimum of the potential well is lower than the Fermi energy of the material, the potential well is populated by electrons that will be confined in the z-direction, therefore forming a 2-dimensional system. The degree to which the potential well is populated by electrons can be tuned by engineering the band gap of the Al$_x$Ga$_{(1-x)}$N.

A HEMT structure typically includes a substrate having a surface which supports epitaxial growth of Group III nitride-based layer such as a GaN channel layer and an Al$_x$Ga$_{(1-x)}$N barrier layer. In the case of GaN HEMTs, the substrate can include many different multi epitaxial layer stacks such as consecutive Al$_x$Ga$_{(1-x)}$N layers with increasing thickness and decreasing Al content, a superlattice such as alternating thin GaN and AlN layers, a structure with a back barrier layer like an additional Al$_x$Ga$_{(1-x)}$N layer with very small Al content, etc. Each type of substrate can be very different in terms of number of layers, layer thicknesses and compositions.

The Al content in the Al$_x$Ga$_{(1-x)}$N barrier layer of a GaN/Al$_x$Ga$_{(1-x)}$N HEMT structure influences the electron density in the 2D electron gas (2DEG) and therefore defines the threshold voltage, breakthrough voltage, and other device parameters. The energy gap of Al$_x$Ga$_{(1-x)}$N is directly proportional to Al concentration. Therefore, Al concentration in the barrier layer should be a very well defined parameter with a very narrow process tolerance. For example, in the case of some GaN/Al$_x$Ga$_{(1-x)}$N HEMT devices, an epitaxial growth process tolerance of 1% is targeted for the Al content in the barrier layer.

As HEMT structures consist of crystalline layers, one way of measuring Al content in the barrier layer is by the use of HRXRD (High Resolution X-Ray Diffraction) methods. To precisely determine the Al content in the barrier layer of a HEMT structure, the lattice parameters may be determined first. In case of an epitaxial layer, lattice constants are defined, among others, by composition and strain or stress.

A conventional method commonly used is the so-called Omega-2Theta scans on 002, 004 and 006 reflections of a GaN/Al$_x$Ga$_{(1-x)}$N HEMT structure. The interpretation or analysis of these scans may raises difficulties due to low intensity peaks and peak overlaps that may prevent precise determination of the lattice parameters and the necessary precision for determining the Al concentration in the barrier layer. For example, in symmetric scans, i.e. (002) it is not possible to distinguish if the shift in peak position is due to a change in strain levels or due to a change in composition.

Accordingly, there is a need for more precisely determining lattice parameters of the barrier layer of a HEMT structure.

SUMMARY

According to an embodiment, a method for determining the concentration of an element of a heteroepitaxial layer includes generating a reciprocal space map in $Q_z$ and $Q_x$ directions in a portion of reciprocal space describing positions of diffracted X-ray peaks of a heteroepitaxial layer and of a substrate on which the heteroepitaxial layer is positioned, determining the position of a diffracted X-ray peak of the substrate in the reciprocal space map in the $Q_x$ direction, determining the expected position of the diffracted X-ray peak of the heteroepitaxial layer in the $Q_x$ direction based on the determined position of the diffracted X-ray peak of the substrate in the $Q_x$ direction, generating a scan of the heteroepitaxial layer in a $Q_z$ direction at the expected position in the $Q_x$ direction, and determining the concentration of a constituent element of the heteroepitaxial layer based on the scan.

A method for determining the concentration of an element of a heteroepitaxial layer includes providing a sample comprising a single crystal substrate having a first major surface and one or more heteroepitaxial layers on the first major surface, directing an incident X-ray beam at the sample, changing an angle between the incident X-ray beam and the sample, the incident X-ray beam undergoing diffraction from a first set of planes of the substrate having a first vector that is asymmetric to the plane of the first major surface of the substrate and producing a diffracted X-ray beam, detecting the diffracted X-ray beam as the angle between the incident X-ray beam and the sample is changed and generating a first scan of intensity of the diffracted X-ray beam as a function of the angle for the substrate, determining the position of a maximum of a peak in the first scan, using the positional relationship between the first set of planes of the substrate and a second set of planes of the heteroepitaxial layer, the positional relationship being known from the crystal structure and lattice parameters of the substrate, from the crystal structure and lattice parameters of the heteroepitaxial layer and the positional relationship between the substrate and the heteroepitaxial layer, wherein the second set of planes has a second vector that is asymmetric to the plane of the first major surface of the heteroepitaxial layer, determining the position of a X-ray beam diffracted from the second set of planes of the heteroepitaxial layer of the sample, directing an incident X-ray beam at the sample at angles about the position and detecting the diffracted X-ray beam as the angle between the incident X-ray beam and the sample is changed to produce a second scan of intensity as a function of the angle for the heteroepitaxial layer, determining the position of the maximum of a peak in the second scan, and determining the composition of the heteroepitaxial layer from the determined position of the maximum in the second scan.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 12 illustrates a graph of intensity as a function of the angle phi for the set of planes (114) for GaN, (105) for GaN and (331) for silicon.

DETAILED DESCRIPTION

Embodiments described herein provide a method and apparatus for high precision and high accuracy measurement of lattice parameters, which may be used to determine the Al content in the $Al_xGa_{(1-x)}N$ barrier layer in a multi-epitaxial-layer structure of a $GaN/Al_xGa_{(1-x)}N$ HEMT by aligning the X-ray apparatus using a set of planes of the substrate that is asymmetric with respect to the plane of the major surface of the substrate. The Al content in the $Al_xGa_{(1-x)}N$ barrier layer is determined by determining the spacing of set of planes of the $Al_xGa_{(1-x)}N$ barrier layer that is asymmetric with respect to the plane of the major surface of the substrate. The alignment of the X-ray apparatus may be carried out by generating a reciprocal space map and the determination of the spacing of set of planes of the $Al_xGa_{(1-x)}N$ barrier layer may be carried out by performing a $Q_z$ scan at a position in a $Q_x$ direction that is determined using the positional relationship between the set of planes of the substrate and the set of planes of the heteroepitaxial layer that is known from the crystal structure and lattice parameters of the substrate, from the crystal structure and lattice parameters of the heteroepitaxial layer and from the positional relationship between the crystal structures of the substrate and the heteroepitaxial layer.

In general, the metrology solution described herein can be used with any heteroepitaxial layer grown on a substrate, for example a III-V material system such as a strained III-V semiconductor layer of a multi-layer arrangement of III-V semiconductor layers which has a concentration of a constituent element such as Al, In, etc. which effects intensity of the conductive channel formed in the multi-layer arrangement. The heteroepitaxial layer may be strained, and may be one of a plurality of heteroepitaxial layers of differing composition arranged in a stacked arrangement on the substrate. The metrology solution described herein can be used to determine the lattice parameters of such a III-V semiconductor layer, which in turn can be used to determine the constituent element concentration of the layer under conditions in which the strain level of the layer of interest relative to the substrate does not change.

Figure 1:
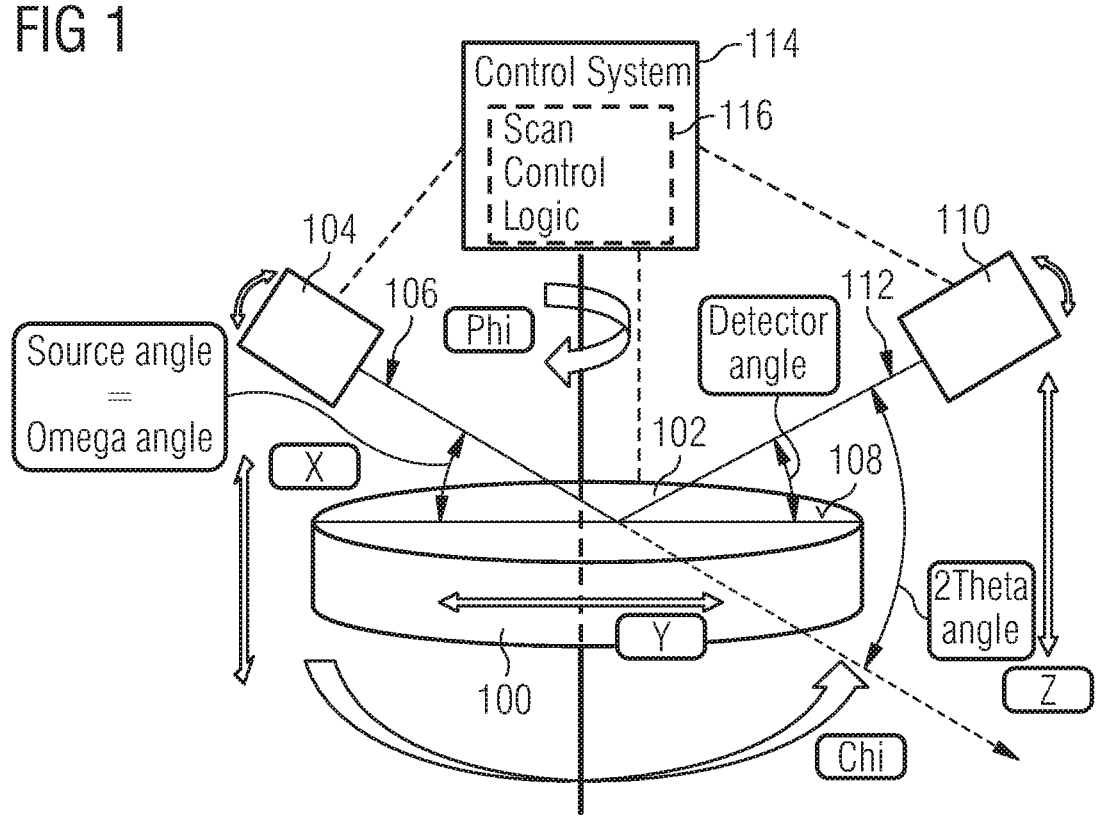
FIG. 1 illustrates a block diagram representation of an embodiment of an HRXRD (High Resolution X-Ray Diffraction) apparatus designed for determining lattice parameters of a heteroepitaxial layer grown on a substrate.

FIG. 1 illustrates an embodiment of an HRXRD (High Resolution X-Ray Diffraction) apparatus designed for determining lattice parameters of a layer heteroepitaxially grown on a substrate. The layer may be a heteroepitaxial strained III-V semiconductor layer of a multi-layer arrangement of III-V semiconductor layers, the strained III-V semiconductor layer having a concentration of a constituent element such as Al, In, etc. which effects intensity of a conductive channel formed in the multi-layer arrangement. The HRXRD apparatus comprises an adjustable stage 100 for receiving a sample 102, an X-Ray source 104 for directing an incident X-Ray beam 106 at a surface 108 of the sample 102, a detector 110 for measuring intensity of the diffracted X-Ray beam 112, and a control system 114 for controlling angular position of the surface 108 of the sample 102 relative to the X-Ray source 104 and the detector 110. For example, the control system 114 can adjust the X-Ray source angle (Omega) and the detector angle (and therefore the 2Theta angle) relative to the surface 108 of the sample 102. The control system 114 can also adjust the x, y and z position of the stage 100 relative to the X-Ray source 104 and the detector 110, as well as rotational angle Phi ($\Phi$) and tilt angle Chi ($\chi$) of the stage 100 and, therefore, the sample 102 relative to the incident and diffracted X-Ray beams 106, 112.

The control system 114 of the HRXRD apparatus can be implemented as a computer system such as a PC (personal computer), tablet computer, server, etc. which is in communication with the adjustable stage 100, the X-Ray source 104 and the detector 110. Communication can be enabled over wired buses or links, over one or more wireless channels or some combination of both. The control system 114 comprises one or more processing circuits such as one or more controllers, processors, ASICs (application-specific integrated circuits), etc. for executing program code which performs the metrology functions described herein. To this end, scan control logic 116, such as reciprocal space mapping control logic, Qx scan control logic and Qz scan control logic, is included in or associated with the processing circuitry of the control system 114 for performing the metrology functions. The control system 114 can also include one or more storage media such as DRAM (dynamic random access memory) and an HDD (hard disk drive) and/or other mass storage device for storing the program code and related data processed and accessed by the processing circuitry, including the scan control logic 116 during execution of program code. The storage medium also stores the results generated by the control system 114.

By appropriately controlling the angular position of the surface 108 of the sample 100 relative to the X-Ray source 104 and the detector 110 of the HRXRD apparatus, the control system 114 can determine the lattice parameters of a particular layer included in the multi-layer sample 102 received by the stage 100, which in turn can be used to determine the constituent element concentration of the strained layer. The sample 102 received by the stage 100 may include multiple III-V semiconductor layers heteroepitaxially grown on a substrate having a different composition. The sample may be a III-V semiconductor chip, a III-V semiconductor wafer, etc.

The sample may include one or more heteroepitaxial layers including a ternary compound represented by a formula $(\alpha_{1-x}\beta_x)\gamma$, wherein $0<x<1$, and wherein the ternary compound has lattice parameters and at least one of the lattice parameters of the ternary compound varies in dependence on x. The heteroepitaxial layer may include a plurality of sublayers, each having a composition represented by the formula $(\alpha_{1-x}\beta_x)\gamma$, wherein $0 \le x \le 1$. At least one of the plurality of sublayers comprises a binary compound with $x=0$ or $x=1$ and at least a further one of the plurality of the sublayers comprises a ternary compounds with $0<x<1$. In some embodiments, the sample may include one or more Group III nitride heteroepitaxial layers, for example including at least one layer including a binary compound, such as GaN, and at least one layer including a ternary compound such as $(Al_{1-x}Ga_x)N$, wherein $0<x<1$ (AlGaN). In some embodiments, $0.14<x<0.22$ and the methods described herein are used to determine the value of x within this range for a heteroepitaxial layer of interest. The heteroepitaxial layer of interest may be a $(Al_{1-x}Ga_x)N$ barrier layer of a HEMT.

The metrology solution is described next in further detail in connection with the exemplary Group III-nitride material system illustrated in FIG. 2, which is provided only for illustrative purposes and should not be considered limiting in any way. The exemplary Group III-nitride material system includes a Si growth substrate, an AlN nucleation layer, several transition layers (TL1-TL4) such as $Al_xGa_{(1-x)}N$ layers of varying thickness and Al concentration, a binary Group III-nitride channel layer such as GaN and a ternary Group III-nitride barrier layer such as $Al_xGa_{(1-x)}N$. Specifically with regard to GaN technology, the presence of polarization charges and strain effects in a GaN-based heterostructure body due to spontaneous and piezoelectric polarization yield a two-dimensional charge carrier gas in the heterostructure body characterized by very high carrier density and carrier mobility. This two-dimensional charge carrier gas, such as a 2DEG (two-dimensional electron gas) or 2DHG (two-dimensional hole gas), forms a conductive channel near the interface between the barrier layer such as 'AlGaN', 'InAlGaN', 'InAlN', etc. and the underlying GaN channel layer. A thin, e.g. 1-2 nm, AlN layer can be provided between the GaN channel layer and the barrier layer to minimize alloy scattering and enhance 2DEG mobility. A cap layer such as a layer of GaN can be formed on the barrier layer.

In a broad sense, the III-V multi-layer arrangements described herein can be formed from any binary, ternary or quaternary III-nitride compound semiconductor material where piezoelectric effects are responsible for the device concept. Any suitable growth substrate such as Si, SiC or sapphire can be used. In the case of a Si growth substrate, a nucleation (seed) layer such as AlN can be formed for preventing chemical reaction between Si and Ga and for decreasing the lattice mismatch to the overlying III-V layers. 'AlInN/AlN/GaN' barrier/spacer/buffer layer structures can also be included in the III-V material stack. In general, the III-V multi-layer arrangements described herein can be realized using any suitable III-V technology such as GaAs, GaN, etc.

Figure 2:
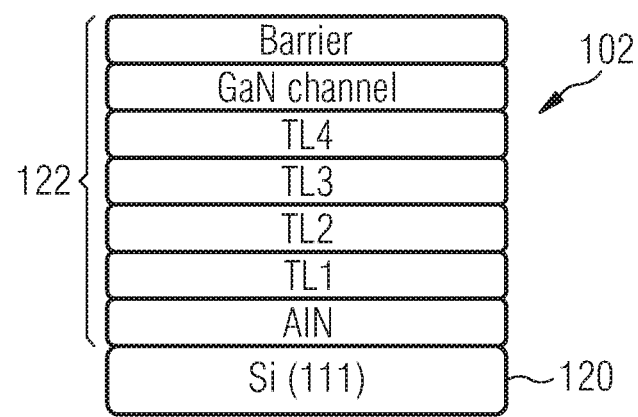
FIG. 2 illustrates a sectional view of an exemplary Group III-nitride material system having a Group III nitride layer for which the lattice parameters are to be determined using the HRXRD apparatus of FIG. 1.

Returning to the Group III-nitride multi-layer arrangement example shown in FIG. 2, the constituent element (e.g. Al) concentration of the ternary Group III-nitride barrier layer effect intensity of the conductive channel formed in the multi-layer arrangement. The constituent element concentration of the Group III-nitride ternary barrier layer can be derived from the barrier layer lattice parameters, which are initially unknown because the exact degree of the constituent element concentration for the barrier layer is not known.

Figure 3:
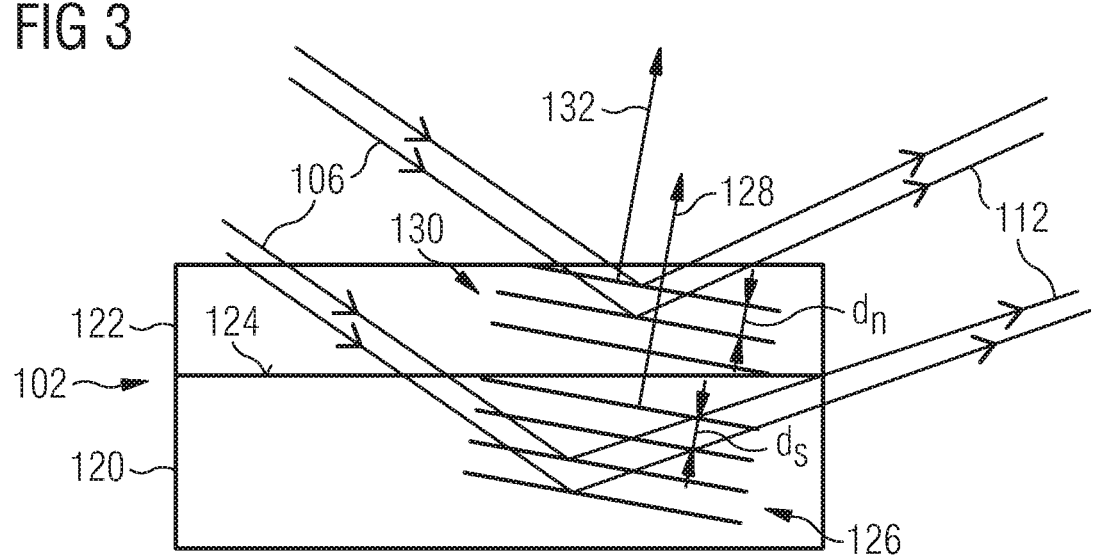
FIG. 3 illustrates a schematic view of the interaction between the incident x-ray beam and a crystalline sample.

FIG. 3 illustrates a schematic view of the interaction between the incident x-ray beam 106 and a crystalline sample 102. For the purposes of illustration, only the substrate 120 and a single heteroepitaxial layer 122 of the sample 102 are illustrated. The substrate 120 may be a single crystal substrate such as silicon which has a crystalline structure characterised by known lattice parameters. The heteroepitaxial layer 122 is arranged on the upper surface 124 of the substrate 120 and may include a ternary compound such as ternary III-V semiconductor, such as aluminium gallium nitride $(Al_{1-x}Ga_xN)$, where $0<x<1$. Aluminium gallium nitride has lattice parameters which vary depending on the relative amounts of aluminium and gallium, i.e. on the value of x.

When the incident X-ray beam 106 impinges the sample 102, the X-ray beam is diffracted from a set of planes 126 of the substrate 120 which satisfy the Bragg condition at this incident angle. The set of planes 126 has a spacing $d_s$, from which the lattice parameters can be calculated. The set of planes 126 can also be described by a vector 128 which extends perpendicularly to the set of planes 126.

The incident x-ray beam 106 is also diffracted by a further set of planes 130 of the heteroepitaxial layer 122 which satisfy the Bragg condition at the incident angle. The further set of planes also have a spacing $d_h$ which is characteristic of the lattice parameters of the heteroepitaxial layer and, therefore, of the composition of the heteroepitaxial layer. The further set of planes 130 of the heteroepitaxial layer 122 may also be described by a vector 132 which extends perpendicular to the set of planes 130. The X-ray beam 112, which is reflected or diffracted from both the set of planes 126 of the substrate 120 and from the further set of planes 130 of the heteroepitaxial layer 122 is collected by the detector 110.

In an $\omega$-$2\theta$ (omega-2theta) scan, the incident angle $\omega$ is changed and the detector moved by $2\theta$ so that that the Bragg condition is met for two or more sets of planes for a sample giving rise to a peak of maximum intensity in a graph of intensity against $2\theta$. For a <100> single crystal sample, the sets of planes 002, 004 may meet the Bragg condition in the $\omega$-$2\theta$ scan giving rise to a peak in intensity from each set of these planes.

As the heteroepitaxial layer 122 is heteroepitaxially grown on the substrate 120, the lattice parameters and, therefore, the d spacing of the heteroepitaxial layer $d_h$ and of the substrate $d_s$ may be sufficiently similar that the position of the peak produced by the set of planes 130 of the heteroepitaxial layer 122 may not be sufficiently distinguishable from the peak associated with the set of planes 126 of the substrate 120 to allow sufficiently accurate determination of the position of the maximum or centreline of the peaks and consequently the composition of the heteroepitaxial layer 122. In this case, a technique known as reciprocal space mapping may be used to allow more detailed analysis of the heteroepitaxial layer 122. In reciprocal space maps composition and strain of a layer can be separated from each other.

Figure 4:
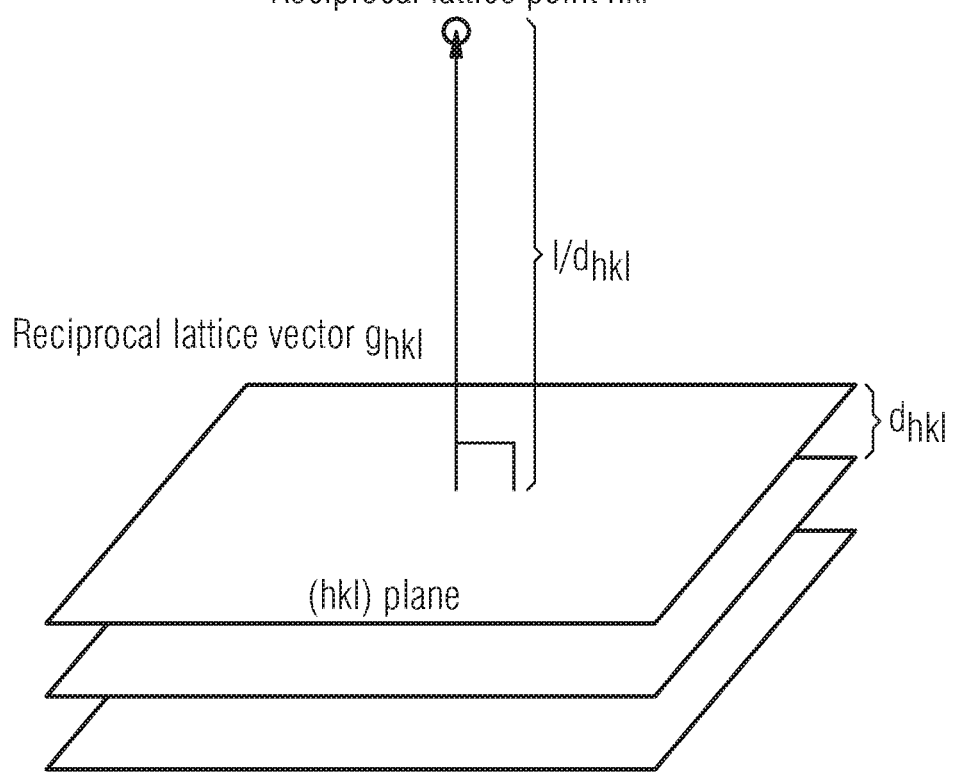
FIG. 4 illustrates sets of planes and the associated reciprocal lattice point.

Reciprocal space is a concept by which a set of planes, for examples the sets of planes 126 130 may be described. As illustrated in FIG. 4 for a generic sample, a set of lattice planes (h k l), which have a spacing of $d_h$m may be described by a reciprocal lattice vector ghkl which extends perpendicularly from the set of planes. The lattice vector ghkl has a length corresponding to the reciprocal of the lattice spacing, i.e. $1/d_{hkl}$, The tip of the reciprocal lattice sector gives the reciprocal lattice point of the set of planes (h k l) in reciprocal space. Each set of planes of a crystal structure may be represented by a reciprocal lattice point in reciprocal space using a construction known as an Ewald sphere.

Figure 5:
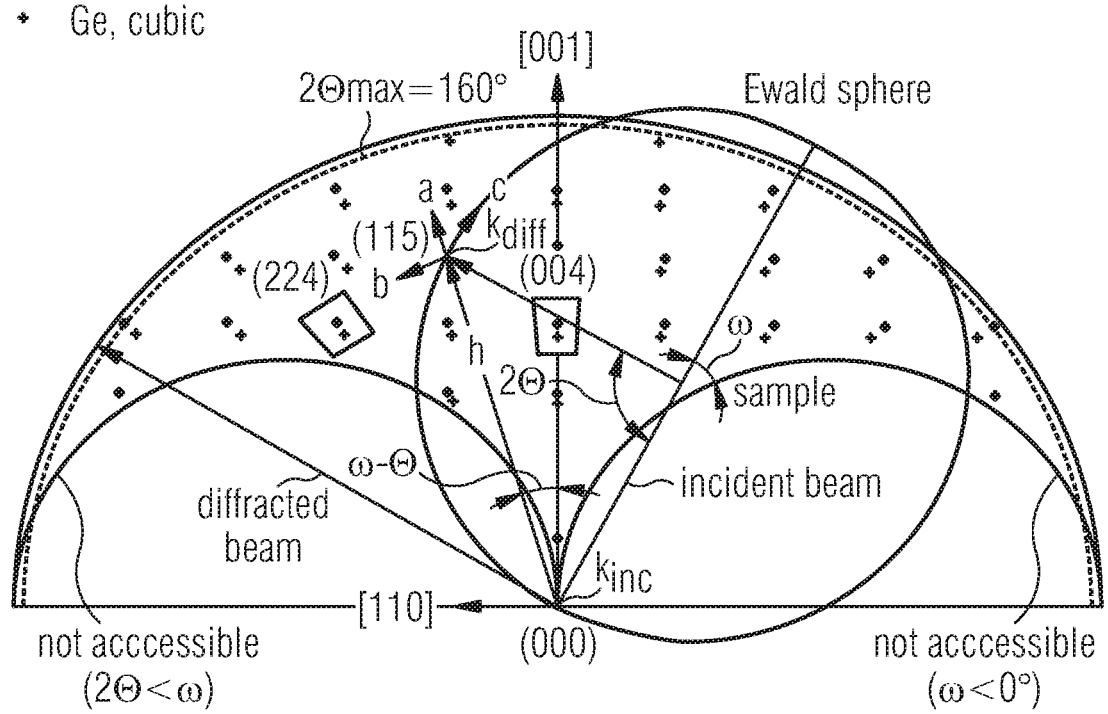
FIG. 5 illustrates a view of the Ewald sphere.

FIG. 5 illustrates a view of the Ewald sphere, which is a geometric construct used in electron, neutron, and X-Ray crystallography to demonstrate the relationship between the wave vector of the incident and diffracted X-Ray beams, the diffraction angle for a given reflection, and the reciprocal lattice of the crystal. The Ewald sphere is represented as a circle centred on the sample, whereby the incident beam forms an angle ω with the surface and the diffracted beam forms an angle 2θ with the surface when the Bragg condition is met. The reciprocal lattice points for a cubic crystal structure for Si are represented as diamonds and for Ge by crosses for a sample having a (001) vector perpendicular to the surface of the sample and a (110) vector parallel to the surface of the sample and arranged at the original (000).

Figure 6:
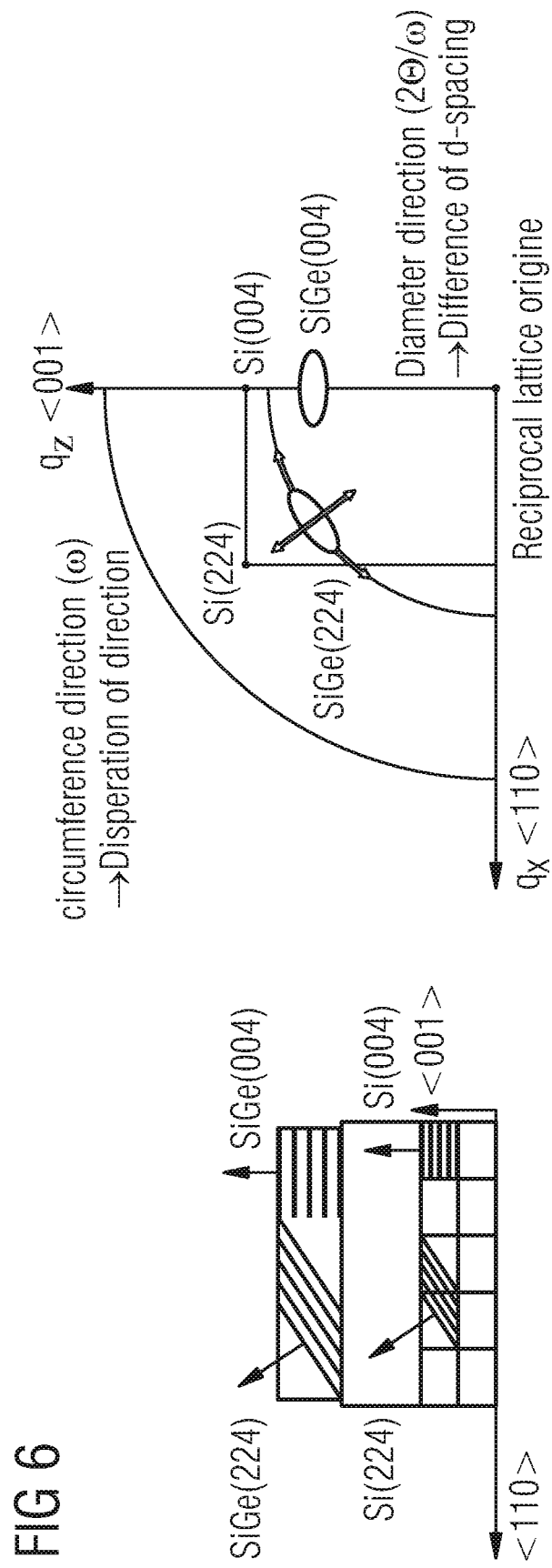
FIG. 6 illustrates sets of planes of a sample in real space and the associated reciprocal lattice points in the Ewald sphere.

FIG. 6 illustrates crystal planes of an exemplary sample including a silicon substrate and a silicon germanium layer heteroepitaxially grown on the silicon substrate and a portion of the Ewald sphere for this sample. In reciprocal space mapping, the directions $Q_x$ and $Q_z$ are used, whereby $Q_x$ forms the horizontal axis and corresponds to the vector of the 110 plane and $Q_z$ extends vertically and corresponds to the vector of the 001 plane. For the example illustrated in FIG. 6, the 004 planes of the silicon substrate produce a point in reciprocal space having a distance in the $Q_z$ direction from the origin corresponding to 1/d(004). The 004 planes of silicon germanium also have a reciprocal lattice point which lies in the Qz direction but at a different diameter or distance from the reciprocal lattice origin as it has a different d spacing. In this particular embodiment, the d spacing of silicon germanium is larger than that of silicon so that the reciprocal of the d spacing is smaller which means that the reciprocal lattice point of the silicon germanium 004 planes is closer to the origin than that of the 004 silicon reciprocal lattice point. For an asymmetric set of a set of planes having an asymmetric vector, such as silicon 204 set of planes, a reciprocal lattice point in the reciprocal space that is produced at a value of Qx on the horizontal axis and at a value of Qz in the vertical direction. Similarly, the 204 set of planes of silicon germanium has a reciprocal lattice point at a different value of Qx and Qz compared to silicon due to the different lattice spacing.

Figure 7:
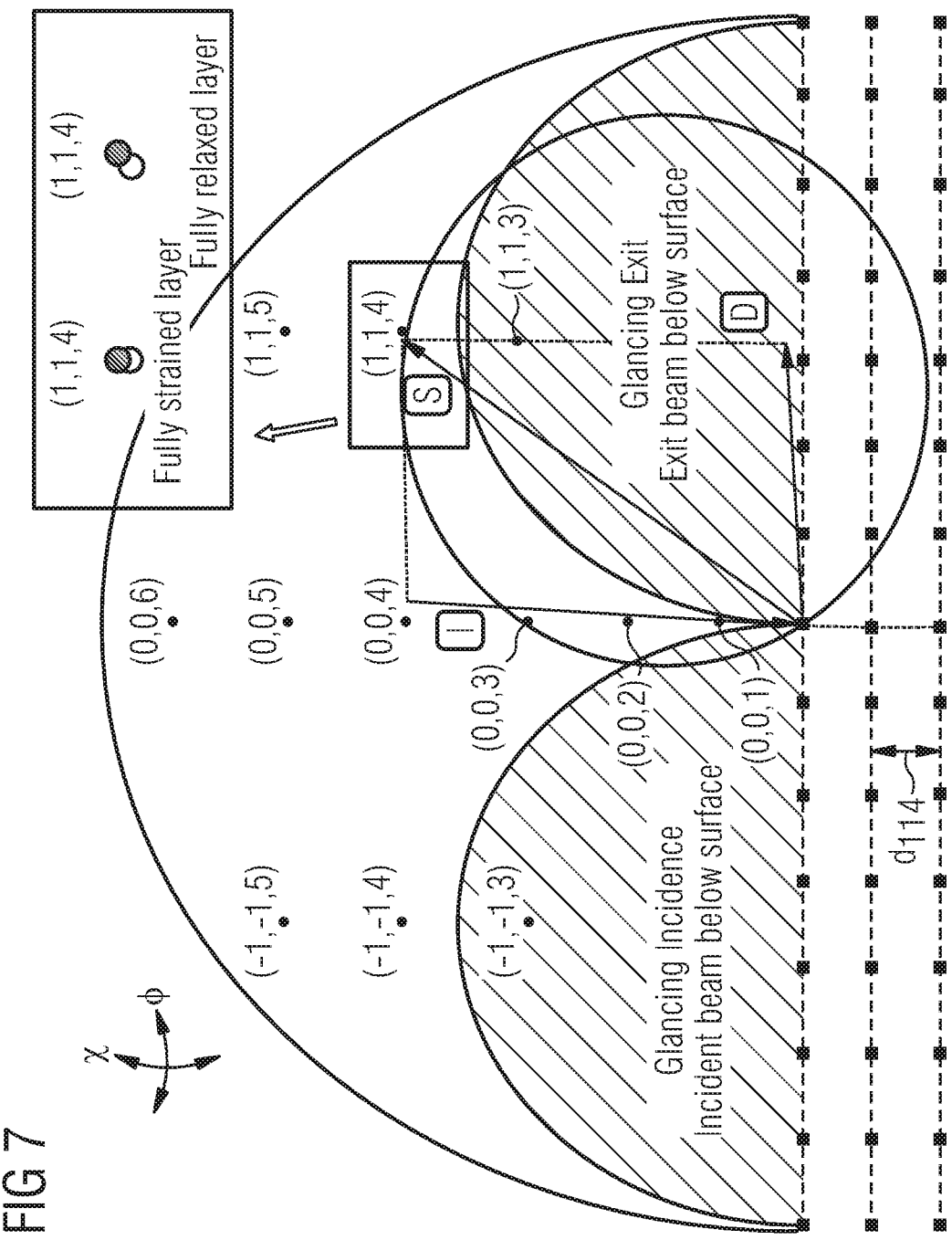
FIG. 7 illustrates an exemplary reciprocal space map for a [001] oriented GaN layer.

FIG. 7 illustrates an exemplary reciprocal space map or q-space map (the Ewald sphere) for an exemplary sample having an $Al_xGa_{(1-x)}N$ barrier layer and a GaN channel layer and illustrates reciprocal lattice points associated with these layers. The q-space map shown in FIG. 7 represents a section through a reciprocal space for a [001] oriented GaN layer. The region above the right semicircle is accessible in glancing exit geometry, the region above the left semicircle in glancing incident geometry. The regions in the semicircle are inaccessible as the sample blocks the X-ray beam. Vectors l and D have length 1/λ where λ=1.54 Å ($CuK\alpha_1$). The vector S is perpendicular to the (1 1 4) plane and has length of d(114). Only the spots which have intensity higher than zero are shown. Planes of atoms are indicated by dotted lines, and are not necessarily parallel to the sample surface. The exploded view depicts the (1 1 4) spot of GaN and $Al_xGa_{(1-x)}N$ fully relaxed and fully strained, where x=0.2 in this example.

In order to measure the positions of these reciprocal lattice peaks in reciprocal space, reciprocal space mapping can be carried out to map a portion of reciprocal space in which reflections form predetermined sets of planes of the substrate and epitaxial layer are expected to be formed. The HRXRD apparatus illustrated in FIG. 1 may be used to generate a reciprocal space map for a sample by performing suitable types of scans, i.e. by suitably changing the relative angle between the incident X-ray beam, sample and detector. Referring to FIG. 5, the direction indicated with a may be investigated by performing a ω-2θ scan in real space, the direction b by performing an w scan, the direction c by performing a 2θ scan. A reciprocal space map may be obtained by performing a series of ω scans at different values of 2θ to map a portion of reciprocal space in which reflections form predetermined sets of planes of the substrate and epitaxial layer are expected to be formed, or by performing ω-θ scans at different w angles to map a portion of reciprocal space in which reflections form predetermined sets of planes of the substrate and epitaxial layer are expected to be formed.

As is illustrated in FIGS. 5 and 7, in practice, some portions of reciprocal space are not accessible due to the arrangement of the apparatus which may limit or restrict the number and types of planes which may be mapped.

Figure 8:
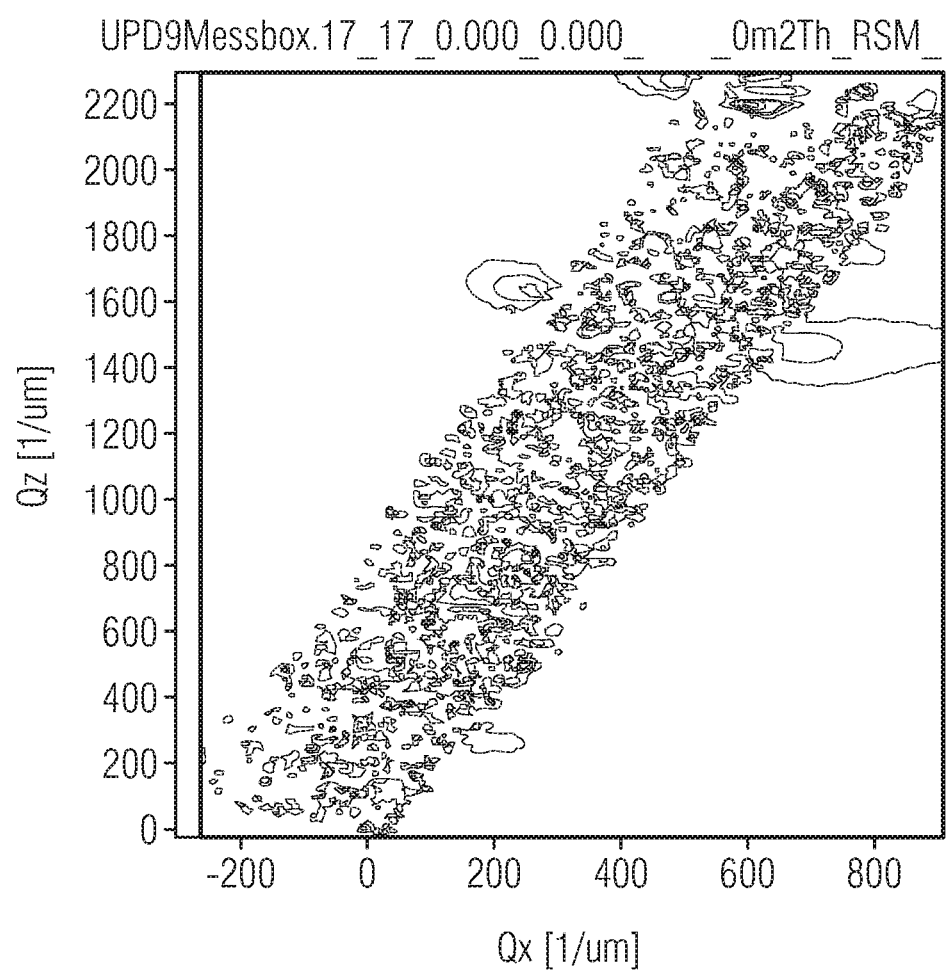
FIG. 8 illustrates an example of a reciprocal space map generated for the sample illustrated in FIG. 2.

FIG. 8 illustrates an example of a reciprocal space map generated for the sample illustrated in FIG. 2 and illustrates areas of a higher intensity which are associated with the various layers of the sample illustrated in FIG. 2. The vertical axis of the reciprocal space map is the Qz direction with units of (1/μm) and the horizontal axis is the Qx direction with units of (1/μm). The intensity peak at the position 0,0 is associated with the (331) set of planes for silicon. The peaks at a position of Qx 615 μm$^{-1}$ and Qz 2200 μm$^{-1}$ are associated with the (105) set of planes for GaN and AlGaN.

In practice, the X-ray apparatus has to be aligned with the sample in order to be able to determine the position of the planes in reciprocal space and, therefore, the d spacing and lattice parameters in real space. The alignment may be performed using a reference layer which has a plane that is as similar as possible to the layer of interest, that is the heteroepitaxial layer whose composition is to be determined. The alignment may be performed to the layer, the layer of interest is strained to. In a multi-layer structure this reference layer may be a layer having the same crystal lattice and known lattice parameters, for example a binary layer such as GaN or AlN in a Group III nitride-based multilayer structure such as a HEMT, or a ternary layer, such as a AlGaN layer, of the multi-layer structure that differs in composition from the layer of interest, but has known lattice parameters. If the layer of interest has a constant strain level relative to the substrate, a plane of the substrate to which the layer of interest is strained may be used as the reference layer. In some embodiments, however, the peaks of the heteroepitaxial layer of interest, for example the AlGaN barrier layer, may not be sufficiently distinguishable in the reciprocal space map from peaks arising from other layers of the sample to allow alignment using this layer, or the GaN layer may not be sufficiently distinguishable in the reciprocal space map to use it for alignment.

The position of the peaks associated with the (105) set of planes for GaN and AlGaN in the $Q_x$ direction relative to the position of the peak of the (331) set of planes for silicon is known from the heteroepitaxial relationship between these layers and the silicon substrate, the crystal structures and the lattice parameters of silicon, GaN and AlGaN as the position of the (105) AlGaN peak in the Qx direction is independent of the concentration of x. Therefore, the peaks associated with the (105) planes of GaN and AlGaN are positioned at a known $Q_x$ offset from the silicon peak of 615 μm$^{-1}$ as the AlGaN is fully strained to the GaN. In contrast, the position of the AlGaN peak in the $Q_z$ direction depends on the concentration of x and is not known.

Therefore, once the position of the (331) silicon peak has been determined, the incident X-ray beam and detector can be moved to a value of $Q_x$ that is offset by 615 $\mu m^{-1}$ from the determined position of the silicon substrate in the $Q_x$ direction and a scan in the direction $Q_z$ performed. The scan in the $Q_z$ direction may be performed at values of $Q_z$ which are lower and higher than the expected portion of the peaks, for example between 1900 $\mu m^{-1}$ and 2300 $\mu m^{-1}$ in order to determine the position in $Q_z$ of the 105 peak associated with the GaN layer (around 2190 $\mu m^{-1}$) and AlGaN layer (around 2250 $\mu m^{-1}$) in the Qz direction at $Q_x$ of 615 $\mu m^{-1}$.

Figure 9:
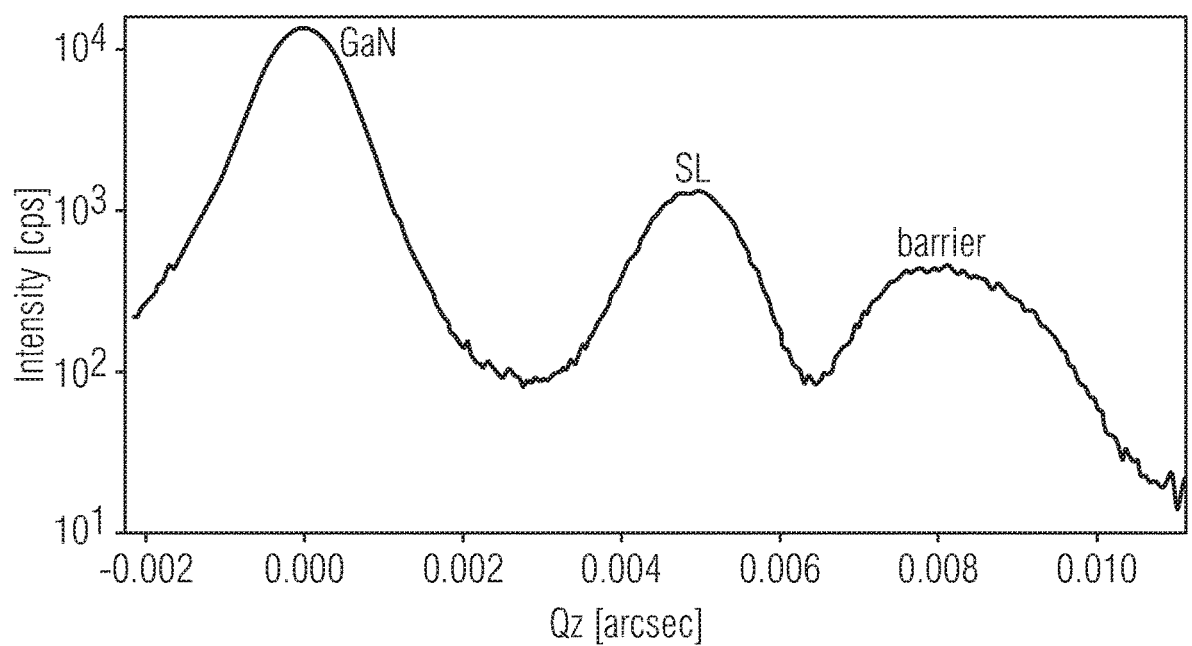
FIG. 9 illustrates a scan of intensity as a function of Qz at a fixed Qx value.

FIG. 9 illustrates a scan of intensity as a function of $Q_z$ at a $Q_x$ value of 615 $\mu m^{-1}$. The scan has a peak with a maximum at around 2190 $\mu m^{-1}$ from the GaN layer and a peak with a maximum of around 2250 $\mu m^{-1}$ from the AlGaN barrier layer. By calculating the difference between the peaks and from the known relationship between the lattice parameters and composition, the value of x and the concentration of Al in the AlGaN barrier layer can be calculated.

Operation of the control system 114 illustrated in FIG. 2 to generate a reciprocal space map and a $Q_z$ scan as described with reference to FIGS. 8 and 9 will now be described.

The control system 114 aligns the multi-layer sample 102 with the X-Ray source 104 and the detector 110 of the HRXRD apparatus so as to satisfy Bragg equations for a chosen (predefined) reflection of the substrate such as the (3, 3, 1) reflection for Si. The control logic 116 of the control system 114 then generates a scan of the sample 100 in the Qx direction for a chosen reflection in reciprocal space based on diffracted X-Ray beam intensity measurements in the Qx direction.

To generate the first scan in the $Q_x$ direction, the control system 114 aligns the exemplary multi-layer arrangement shown in FIG. 2 with the X-Ray source 104 and the detector 110 of the HRXRD apparatus so as to satisfy Bragg equations for a chosen (predefined) reflection of the substrate such as the (3, 3, 1) reflection for Si. Because the substrate is a single crystal with well-defined lattice parameters, the Bragg equations can be readily solved. As part of the scanning process in the $Q_x$ direction for the chosen reflection, the control system 114 changes one or more of the angles Omega, 2 Theta, Chi and/or Phi while an incident X-Ray beam is directed at the surface of the multi-layer arrangement. A reciprocal space map may be generated by scanning in the $Q_x$ and $Q_z$ directions around the chosen reflection for the substrate.

The position of a particular plane, i.e. chosen reflection, of the heteroepitaxial layer relative to the measured position of the chosen reflection of the substrate is known from the known lattice parameters of the substrate and heteroepitaxial layer, crystal structure and relative orientation between them, i.e. epitaxial, for planes having an asymmetric vector. Therefore, an offset in $Q_x$ between the chosen reflection of the substrate and the chosen reflection of the heteroepitaxial layer is known. This known offset in $Q_x$ can be applied by positioning the X-Ray source 104 and the detector 110 of the HRXRD apparatus at the expected position in the $Q_x$ direction and a scan in the $Q_z$ direction at this position in $Q_x$ can be performed. An incident X-Ray beam is then directed at the surface of the sample at the expected $Q_x$ position and a scan is performed in the $Q_z$ direction to produce a diffracted X-Ray peak for the layer or layers of interest, such as the AlGaN barrier layer and the GaN channel layer, in the $Q_z$ direction.

The concentration of the constituent element (e.g. Al, In, etc.) in the ternary III-V barrier layer is determined based on the scan in the $Q_z$ direction, by identifying a position of the maximum of the peak in the $Q_z$ direction. As such, the concentration of the constituent element in the ternary III-V barrier layer can be precisely determined based on the known relationship between the concentration and lattice parameters.

Specifically for a HEMT which includes an $Al_xGa_{(1-x)}N$ barrier layer adjoining a GaN channel layer, the Al concentration of the $Al_xGa_{(1-x)}N$ barrier layer is determined by identifying the maximum of the X-Ray peak in the $Q_z$ which corresponds to the $Al_xGa_{(1-x)}N$ barrier layer.

The scan control logic 116 of the control system 114 generates a scan of the sample 100 in the Qz direction for the chosen reflection in the reciprocal space based on diffracted X-Ray beam intensity measurements in the Qz direction. Position in the Qz direction correlates to the d-spacing of the peak, where the diffraction space coordinates are defined as Qx, Qy and Qz. The control system 114 aligns the scan in the Qx direction for the heteroepitaxial layer based on the measured diffracted X-Ray peak in the Qx scan which corresponds to the substrate. This way, the scan in the Qz direction is aligned on the substrate in the Qx direction. For a (114) reflection for silicon and a (105) reflection for AlGaN, the control system 114 moves the relative position of the X-ray source, sample and detector with an offset of 615 $\mu m^{-1}$ in the Qx direction and performs a scan in the Qz direction between 1900 $\mu m^{-1}$ and 2300 $\mu m^{-1}$ in order to determine the position in Qz of the (105) peak associated with the GaN layer (around 2190 $\mu m^{-1}$) and AlGaN layer (around 2250 $\mu m^{-1}$) in the Qz direction. All diffracted X-Ray beam intensity measurements are taken by the detector 110 of the HRXRD apparatus and analyzed by the control system 114 to identify the diffracted X-Ray peaks in the Qx and Qz directions of the reciprocal space.

Figure 10:
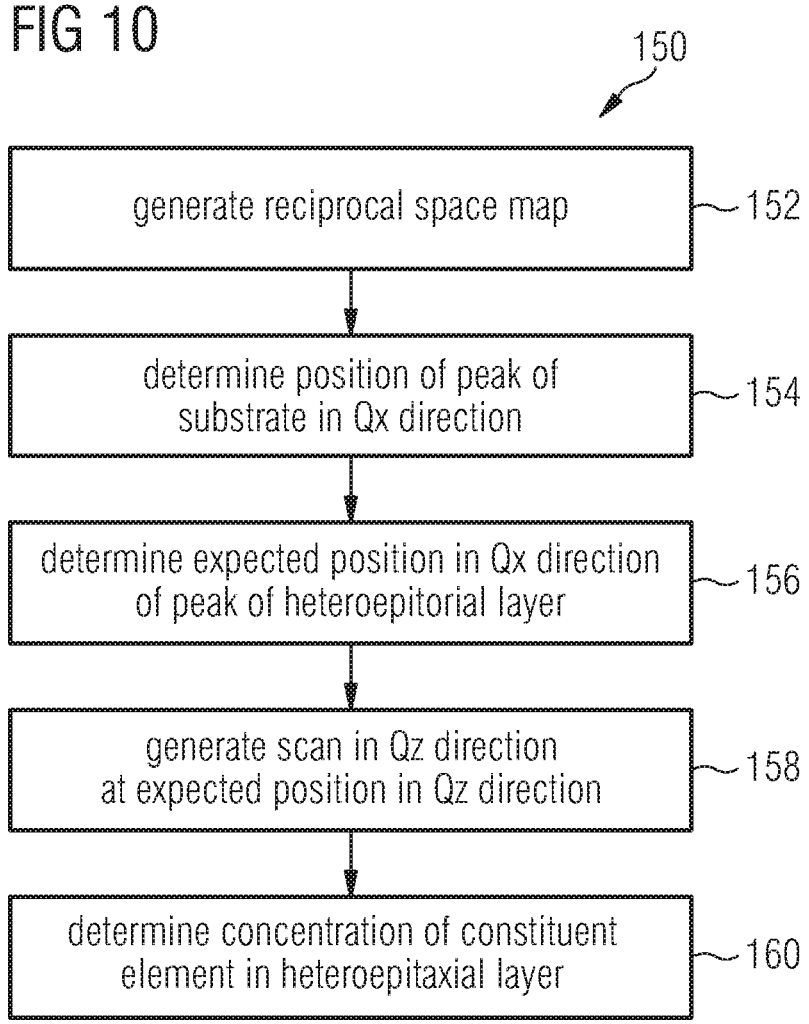
FIG. 10 illustrates a flow diagram of a method for determining the concentration of a constituent element in a heteroepitaxial layer on a substrate.

FIG. 10 illustrates a flow diagram 150 of a method for determining the concentration of an element of a heteroepitaxial layer according to an embodiment. In block 152, a reciprocal space map in Qz and Qx directions is generated in a portion of reciprocal space describing positions of diffracted X-ray peaks of a heteroepitaxial layer and of a substrate on which the heteroepitaxial layer is positioned. As discussed below, block 152 of the method is only needed for the first kind of a sample as a reference measurement. In block 154, the position of a diffracted X-ray peak of the substrate in the reciprocal space map in the Qx direction is determined. In block 156, the expected position of the diffracted X-ray peak of the heteroepitaxial layer in the Qx direction based on the determined position of the diffracted X-ray peak of the substrate in the Qx direction is determined. In block 158, a scan of the heteroepitaxial layer in a Qz direction at the expected position in the Qx direction is generated. In block 160, the concentration of a constituent element in the heteroepitaxial layer based on the scan is determined. The action described in block 152 may be used as a reference measurement for two or more further samples and is, therefore, optional. For example, the action described in block 152 of generating a reciprocal space map in Qz and Qx directions in a portion of reciprocal space describing positions of diffracted X-ray peaks of a heteroepitaxial layer and of a substrate on which the heteroepitaxial layer is positioned may be performed for only for the first sample of a series of samples having a heteroepitaxial layer having the same strain level relative to the reference layer. The action described in block 152 may be repeated at intervals depending on instrument drift, for example.

In this method, the alignment is performed using a peak from a set of planes of the substrate. The source and detector are then moved relative to the sample to a value of Qx at which the peak associated with the barrier layer is expected to be since the relative relationship between a set of planes of the substrate having an asymmetric vector and a set of planes of the heteroepitaxial layer having an asymmetric vector is known. By using an asymmetric vector, the position in the $Q_x$ direction is unaffected by composition whereas the position in the $Q_z$ direction is affected by the composition. Therefore, by performing a scan in the $Q_z$ direction at the value of $Q_x$, the composition of the barrier layer may be determined, if the layer of interest has a known strain level relative to the reference layer. The concentration of the constituent element is determined based on the position of a maximum of a peak of the scan in the $Q_z$ direction. The scan may be represented in the form of a graph having intensity on the vertical axis and $Q_z$ on the horizontal axis.

In some embodiments, the heteroepitaxial layer comprises a Group III-nitride, which may be described as $Al_{1-x}B_xN$, wherein $0 \le x \le 1$, a lattice parameter of the Group III-nitride varies dependent on x, and A and B represent different Group III elements, for example Al and Ga. The constituent element whose concentration is to be determined is A. However, the heteroepitaxial layer may include other compositions, such as a III-V semiconductor material, or any material having lattice parameters that are dependent on its composition.

In some embodiments, a plurality of heteroepitaxial layers are arranged on the substrate and comprise differing values of x, for example one or more of the heteroepitaxial layers may include a binary heteroepitaxial layer in which x=0 and one or more of the heteroepitaxial layers may include a ternary heteroepitaxial layer, in which 0<x<1. The concentration of the constituent element may be determined based on the difference between a peak of the scan in the $Q_z$ direction for a binary heteroepitaxial layer in which x=0 and for the ternary heteroepitaxial layer of interest, in which 0<x<1.

The concentration of the constituent element may include comparing a centerline of the diffracted X-Ray peak which identifies a binary Group III nitride semiconductor layer to a centerline of the diffracted X-Ray peak which identifies a ternary Group III nitride semiconductor layer, the difference between the centerlines indicating the concentration of the constituent element in the ternary Group III-N semiconductor layer. However, the method is not limited to a binary compound as a reference. For example, the reference layer could be a ternary of known composition, as long as the layer of interest is fully strained to the reference layer. For the layer of interest, a fixed strain relation to the substrate would also be sufficient.

The reciprocal space map and the scan in the $Q_z$ direction may be generated using an X-Ray diffraction apparatus which includes an adjustable stage for receiving the substrate, an X-Ray source for directing an incident X-Ray beam at the heteroepitaxial layer on the substrate, and a detector for measuring intensity of a diffracted X-Ray beam.

The reciprocal space map may be generated by changing angles between the surface of the heteroepitaxial layer on the substrate and the X-Ray source and between the surface of the heteroepitaxial layer on the substrate and the detector while directing the incident X-Ray beam at the surface of the heteroepitaxial layer at angles around an angle satisfying the Bragg equation for a chosen reflection of the substrate so as to produce a diffracted X-Ray peak which identifies the substrate having a position in the Qz direction and in the Qx direction.

The scan in the Qz direction may be generated by changing angles between the surface of the heteroepitaxial layer on the substrate and the X-Ray source and between the surface of the heteroepitaxial layer on the substrate and the detector while directing the incident X-Ray beam at the surface of the heteroepitaxial layer at angles around an angle satisfying the Bragg equation for a chosen reflection of the heteroepitaxial layer so as to produce a diffracted X-Ray peak in the $Q_z$ direction at the expected position in the $Q_x$ direction which identifies a heteroepitaxial layer.

The scan in the $Q_z$ direction may be generated by changing angles between the surface of one of a plurality of heteroepitaxial layers on the substrate and the X-Ray source and between the surface of the heteroepitaxial layer on the substrate and the detector while directing the incident X-Ray beam at the surface of the heteroepitaxial layer at angles around an angle satisfying the Bragg equation for a chosen reflection of the heteroepitaxial layer so as to produce a plurality of diffracted X-Ray peaks in the $Q_z$ direction at the expected position in the $Q_x$ direction. The plurality of diffracted X-Ray peaks in the $Q_z$ direction identify different ones of the heteroepitaxial layers.

The scan in the $Q_z$ direction may be generated by aligning the X-Ray source and the detector on a diffracted X-Ray peak at the expected position in the $Q_x$ direction which identifies the heteroepitaxial layer, directing the incident X-Ray beam at the surface of the substrate while aligned at the expected position in the $Q_x$ direction, and moving the X-ray source, sample and/or detector to scan in the $Q_z$ direction so as to produce a diffracted X-Ray peak for the heteroepitaxial layer in the $Q_z$ direction.

In an embodiment, the X-ray source, sample and/or detector may be further moved to scan in the $Q_z$ direction so as to produce a diffracted X-Ray peak for a further heteroepitaxial layer in the $Q_z$ direction, for example a GaN channel layer in addition to an AlGaN barrier layer.

The concentration of the constituent element may be determined based on the scan in the $Q_z$ direction by identifying a position of the maximum of the scattered X-Ray peak in the $Q_z$ direction.

The method according to any one of the embodiments may be used for a sample including a HEMT (high-electron mobility transistor) structure. In the HEMT structure, one heteroepitaxial layer includes an $Al_xGa_{(1-x)}N$ barrier layer, wherein 0<x<1, which adjoins a further heteroepitaxial layer that includes a GaN buffer layer. In some embodiments, 0.14<x<0.22. One or more further Group III-N layers may be arranged between the GaN buffer layer and the substrate. The substrate may be provided by single crystal silicon such as a <100> single crystal silicon substrate.

For the HEMT structure including a heteroepitaxial layer $Al_xGa_{(1-x)}N$ barrier layer which adjoins a heteroepitaxial layer GaN buffer layer, the concentration of the constituent element may be determined by identifying the maximum of a diffracted X-Ray peak in the Qz scan which corresponds to the $Al_xGa_{(1-x)}N$ barrier layer, identifying the position of the maximum in Qx and Qz, calculating the lattice parameters from the position of the maximum and calculating the composition based on a known relationship between x and the lattice parameters.

As mentioned above, proper selection of the set of planes of the substrate an the set of planes of the heteroepitaxial layer enables the method to be used to reliably determine the concentration of the constituent element. In some embodiments, an asymmetric reflection, i.e. a set of planes with a vector that is asymmetric to the plane of the major surface of the substrate, is chosen for both the substrate and the heteroepitaxial layer. An asymmetric reflection may be chosen so that the influence of strain and composition can be separated, for example so that strain fails to influence the position of the peaks in the scans. This enables the composition to be more accurately determined from the position of the peak. In some embodiments, the substrate is Si and the chosen reflection is a (3 3 1) reflection of Si and the reflection of the heteroepitaxial layer at the expected position in the $Q_x$ direction include one or both of a (1, 0, 5) reflection of a $Al_{1-x}Ga_xN$ layer, wherein 0<x<1, and a (1 0 5) reflection of GaN. In some embodiments, the substrate is Si and the chosen reflection is a (4 0 4) reflection of Si and the reflection of the heteroepitaxial layer at the expected position in the Qx direction include one or both of a (2 0 4) reflection of the $Al_{1-x}Ga_xN$ layer, wherein 0<x<1, and a (204) reflection of GaN.

In order to investigate the composition of one of the heteroepitaxial layers, for example an aluminium gallium nitride barrier layer arranged on a gallium nitride channel layer, which in turn may be arranged on two or more transition layers and/or a super lattice structure including multiple binary and ternary III-nitride layers, it is helpful to carefully align the sample with respect to the incident X-ray beam such that the exact position of the diffracted peak can be determined and the composition of the aluminium gallium nitride layer can be determined from this determined position. This may be carried out by determining the position of a peak diffracted from a further heteroepitaxial layer, such as the gallium nitride channel layer.

However, as discussed above, for some samples, such as samples including a multiple heteroepitaxial layers arranged on a single crystal substrate, the multiple hetero epitaxial layers may give rise to diffracted x-ray peaks at a given incident angle which can be insufficiently resolved and distinguished from one another in some types of x-ray scan, for example a θ-2θ scan. This occurs if the Bragg condition for a particular set of planes is satisfied at a similar incident angle for more than one of the heteroepitaxial layers to an extent such that the peak in the maximum diffracted X-ray beam from each of the heteroepitaxial layers overlaps with one or more of the peaks produced by other heteroepitaxial layers.

In samples including multiple heteroepitaxial layers in which the peak diffracted from the heteroepitaxial layer of interest, in this example, the aluminium gallium nitride barrier layer, cannot be sufficiently distinguished from peaks arising from further heteroepitaxial layers of structure, the alignment may take place by determining the position of a peak of the substrate.

As discussed described above, this in some embodiments, this alignment may be carried out by generating a reciprocal space map of an area of reciprocal space covering the position of the selected set of planes or vector of the substrate and, optionally, a set of planes or vector of the heteroepitaxial layer or layers of interest and, also optionally, a further heteroepitaxial layer having a different composition, for example a GaN if the layer of interest is AlGaN.

In some embodiments, the position of the diffracted peak arising from the selected set of planes or vector of the sample may be determined using one or more single scans rather than generating a complete reciprocal space map. This embodiment may be used to save measurement time.

Figure 11:
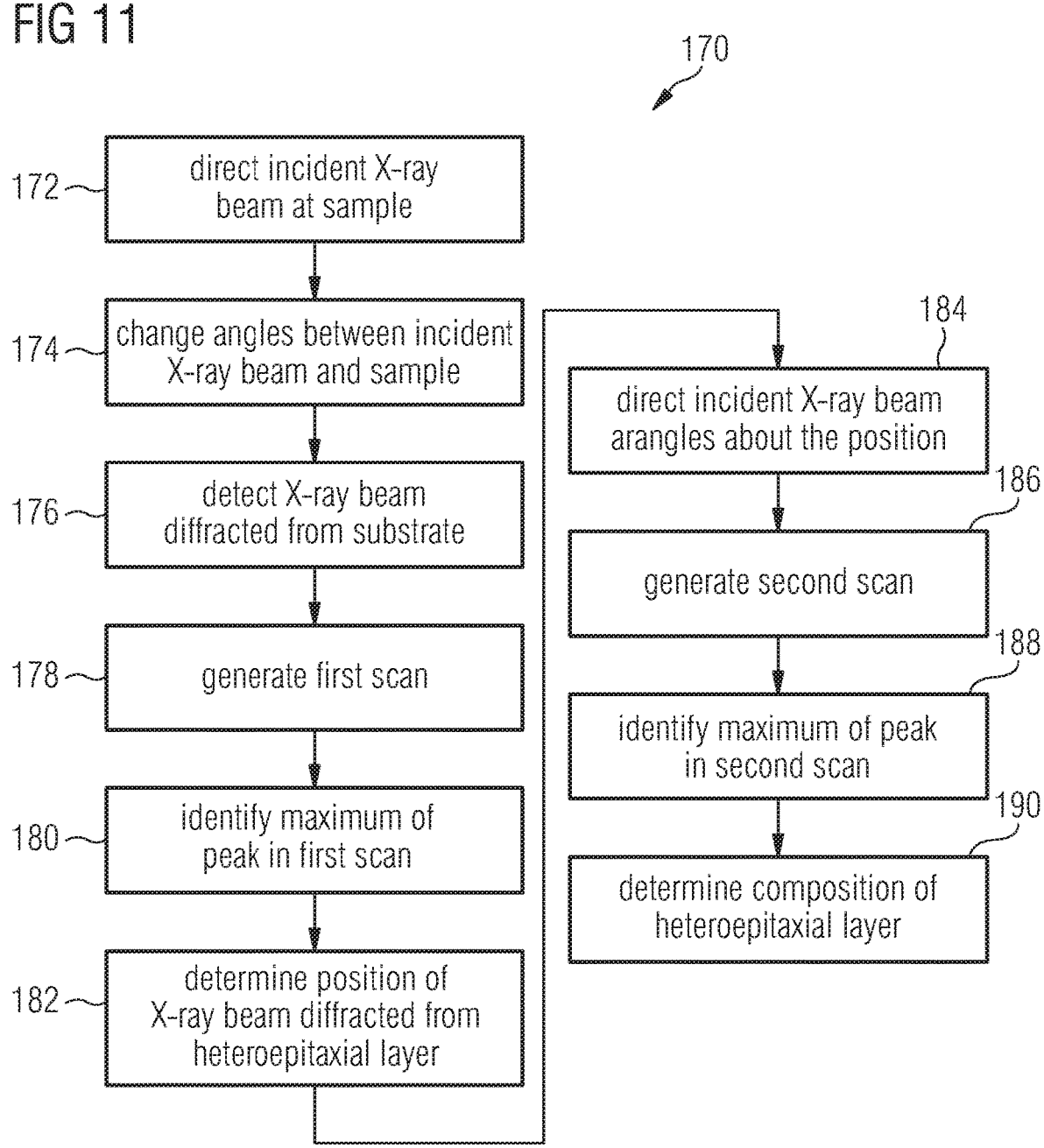
FIG. 11 illustrates a flow diagram of a method for determining the concentration of a constituent element in a heteroepitaxial layer on a substrate.

In some embodiments, a reciprocal space map is not generated for an area describing positions of diffracted X-ray peaks of both the substrate and one or more heteroepitaxial layers grown on the substrate. The position of a single diffracted X-ray peak for the substrate may generated, its position determined, and the incident beam and detector moved to a position in the Qx direction corresponding to the expected position of the one or more epitaxial layers and a scan in the Qz direction is generated at this value of Qx. FIG. 11 illustrates a flow chart 170 of an embodiment of such a method.

In block 172, an incident X-ray beam is directed at a sample comprising a single crystal substrate having a first major surface and a heteroepitaxial layer on the first major surface. In block 174, an angle between the incident X-ray beam and the sample is changed such that the incident X-ray beam undergoes diffraction from a first set of planes of the substrate having a first vector that is asymmetric to the plane of the first major surface of the substrate and forms a diffracted X-ray beam. In block 176, the diffracted X-ray beam is detected as the angle between the incident X-ray beam and the sample is changed. In block 178, a first scan of intensity of the diffracted X-ray beam as a function of the angle is produced. In block 180, the position of a maximum of a peak in the first scan is determined. In block 182, the position of a X-ray beam diffracted from a second set of planes of the heteroepitaxial layer of the sample is determined using the positional relationship between the first set of planes of the substrate and the second set of planes of the heteroepitaxial layer, the positional relationship being known from the crystal structure and lattice parameters of the substrate, from the crystal structure and lattice parameters of the heteroepitaxial layer and the positional relationship between the substrate and the heteroepitaxial layer. The second set of planes has a second vector that is asymmetric to the plane of the first major surface of the heteroepitaxial layer. In block 184, an incident X-ray beam is directed at the sample at angles about the position. In block 186, the diffracted X-ray beam is detected to produce a second scan of intensity as a function of angle for the heteroepitaxial layer. In block 188, the position of the maximum of a peak in the graph is determined. In block 190, the composition of the heteroepitaxial layer is determined using the determined position of the maximum of the peak in the second scan.

The detected position of the peak diffracted from the set of planes of the substrate indicates that actual position of the set of planes in real space. The position of the set of planes of the heteroepitaxial layer with respect to the measured position is known since this relative relationship is determined by the lattice parameters of the substrate and of the heteroepitaxial layer and by the relative orientation between the substrate and the heteroepitaxial layer, which is itself known as the layer is heteroepitaxially orientated with respect to the substrate. Therefore, the incident X-ray beam can be moved to a position at which the Bragg condition for the selected set of the planes of the heteroepitaxial layer is met and the detector can be moved to the position at which the diffracted X-ray beam is expected. Since the exact position of the maximum of the peak varies dependent on the composition of the heteroepitaxial layer, a scan is produced from positions wither side of the expected position so as to cover the possible range of Bragg angles which may be satisfied. In order to determine the composition, a set of plane may be selected in which the composition affects only one direction of the lattice so that a scan in one direction is sufficient to accurately determine the composition.

In some embodiments, the heteroepitaxial layer comprises a ternary compound represented by a formula $(\alpha_{1-x}\beta_x)\gamma$, wherein $0<x<1$, whereby the ternary compound has lattice parameters and at least one of the lattice parameters of the ternary compound varies in dependence on x.

In some embodiments, the heteroepitaxial layer comprises a plurality of sublayers, each having a composition represented by the formula $(\alpha_{1-x}\beta_x)\gamma$, wherein $0\leq x\leq 1$, wherein in at least one of the plurality of sublayers comprises a binary compound with x=0 or x=1 and at least a further one of the plurality of the sublayers comprises a ternary compounds with $0<x<1$. However, the reference layer is not limited to a binary compound. One layer with a known composition as reference layer, to which the layer of interest is fully strained to, may be used. Alternatively it is sufficient if the layer of interest has a constant strain level relative to the substrate.

In an embodiment, the binary compound is GaN and the ternary compound is $(Al_{1-x}Ga_x)N$, wherein $0.14<x<0.22$.

The concentration of aluminium and, therefore, the value of x, may be determined by determining the position of a first maximum in the graph of intensity as a function of angle for a reflection from a set of planes of GaN and the position of a second maximum in the graph of intensity as a function of angle for a reflection from a set of planes of AlGaN. A difference between position of the first maximum and the second maximum may be determined and x is calculated using the determined difference.

The set of planes that is selected for the substrate and for the heteroepitaxial layer or heteroepitaxial sublayers may be selected taking into account the following criteria. A first set of planes of the substrate having a vector that is asymmetric to the plane of the first major surface of the substrate. In other words the first set of planes has a vector that forms an angle psi and an angle $phi_1$ with respect to a set of planes of the substrate having a first vector that is perpendicular to the plane of the first major surface of the substrate in reciprocal space.

A second set of planes of the heteroepitaxial layer having a vector that is asymmetric to the plane of the first major surface of the substrate is selected, whereby the vector of the second set of planes also forms the angle psi to the a set of planes of the substrate having a first vector that is perpendicular to the plane of the first major surface of the substrate in reciprocal space and an angle $phi_2$ with respect to a set of planes of the substrate having a first vector that is perpendicular to the plane of the first major surface of the substrate in reciprocal space, wherein the $phi_1=phi_2$.

FIG. 12 illustrates a graph of intensity as a function of the angle phi for the set of planes (114) for GaN, (105) for GaN and (331) for silicon. As can be seen, the (331) set of planes for silicon and the (105) set of planes for GaN have a peak at a common phi angle of around 110°. This combination of set of planes is, therefore, suitable for use in the methods described herein. A further set of planes which fulfil the criteria are (404) for silicon and (204) for GaN.

It is also possible to use these methods to produce a reciprocal space map. The angle between the incident X-ray beam and the sample may be translated into Qx and Qz in reciprocal space. This may be performed using known conversion formulae. The angle between the incident X-ray beam and the sample may then be changed such that a reciprocal space map is generated from the detected diffracted X-ray beam. For example, if ω is the angle between the incident X-ray beam and the first major surface of the substrate and 2θ is the angle between the incident X-ray beam and the diffracted X-ray beam, a series of ω/2θ scans at a plurality of w values may be carried out to produce a reciprocal space map. The values of ω and 2θ may be selected such that a portion of reciprocal space is mapped in which the selected set of planes of the substrate and/or the heteroepitaxial layer or layers produce a diffracted peak.

By aligning for the Qz scan in the Qx direction using a peak of the substrate, peak separation and simultaneous determination of the constituent element (e.g. Al, In, etc.) concentration in a strained III-V semiconductor layer of interest, for example the AlGaN barrier layer, can be obtained. In more detail, a Qz scan in HRXRD means a linear scan in a reciprocal space in the Qz direction. The Qz scan can be performed on an asymmetric reflection such as (1, 1, 4) for GaN.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for determining the concentration of an element of a heteroepitaxial layer, the method comprising:
    generating a reciprocal space map in $Q_z$ and $Q_x$ directions in a portion of a reciprocal space describing positions of diffracted X-ray peaks of a heteroepitaxial layer and of a substrate on which the heteroepitaxial layer is positioned;
    determining the position of a diffracted X-ray peak of the substrate in the reciprocal space map in the $Q_x$ direction;
    determining the expected position of the diffracted X-ray peak of the heteroepitaxial layer in the $Q_x$ direction based on the determined position of the diffracted X-ray peak of the substrate in the $Q_x$ direction;
    generating a scan of the heteroepitaxial layer in a $Q_z$ direction at the expected position in the $Q_x$ direction; and
    determining the concentration of a constituent element of the heteroepitaxial layer based on a difference between a peak of the scan in the $Q_z$ direction for a reference layer and for the heteroepitaxial layer,
    wherein the heteroepitaxial layer comprises a Group III-nitride, $A_{1-x}B_xN$,
    wherein $0\leq x\leq 1$,
    wherein a lattice parameter of the Group III-nitride varies dependent on x,
    wherein the constituent element is A,
    wherein a plurality of heteroepitaxial layers are arranged on the substrate and comprise differing values of x, wherein the concentration of the constituent element A is determined based on the difference between the peak of the scan in the $Q_z$ direction for the reference layer and for a ternary heteroepitaxial layer, in which 0<x<1, wherein determining the concentration of the constituent element comprises comparing a centerline of the diffracted X-Ray peak which identifies a binary Group III-nitride semiconductor layer in which x=0 to a centerline of the diffracted X-Ray peak which identifies a ternary Group III-nitride semiconductor layer, the difference between the centerlines indicating the concentration of the constituent element in the ternary Group III-nitride semiconductor layer.

2. The method of claim 1, wherein the concentration of the constituent element is determined based on the position of a maximum of the peak of the scan in the $Q_z$ direction.

3. The method of claim 1, wherein the reciprocal space map and the scan in the $Q_z$ direction are generated using an X-Ray diffraction apparatus which includes an adjustable stage for receiving the substrate, an X-Ray source for directing an incident X-Ray beam at the heteroepitaxial layer on the substrate, and a detector for measuring intensity of a diffracted X-Ray beam.

4. The method of claim 3, wherein the generating the reciprocal space map comprises:

changing angles between the surface of the heteroepitaxial layer on the substrate and the X-Ray source and between the surface of the heteroepitaxial layer on the substrate and the detector while directing the incident X-Ray beam at the surface of the heteroepitaxial layer at angles around an angle satisfying the Bragg equation for a chosen reflection of the substrate so as to produce a diffracted X-Ray peak having a position in the $Q_z$ direction and in the $Q_x$ direction.

5. The method of claim 4, wherein the generating the scan in the $Q_z$ direction comprises:

changing angles between the surface of the heteroepitaxial layer on the substrate and the X-Ray source and between the surface of the heteroepitaxial layer on the substrate and the detector while directing the incident X-Ray beam at the surface of the heteroepitaxial layer at angles around an angle satisfying the Bragg equation for a chosen reflection of the heteroepitaxial layer so as to produce a diffracted X-Ray peak in the $Q_z$ direction at the expected position in the $Q_x$ direction, the diffracted X-ray peak identifying a heteroepitaxial layer.

6. The method of claim 4, wherein the generating the scan in the $Q_z$ direction comprises:

changing angles between the surface of one of a plurality of heteroepitaxial layers on the substrate and the X-Ray source and the detector while directing the incident X-Ray beam at the surface of the heteroepitaxial layer at angles around an angle satisfying the Bragg equation for a chosen reflection of the heteroepitaxial layer so as to produce a plurality of diffracted X-Ray peaks in the $Q_z$ direction at the expected position in the $Q_x$ direction, the plurality of diffracted X-Ray peaks identifying different ones of the heteroepitaxial layers.

7. The method of claim 6, wherein the substrate is Si and the chosen reflection is a (3 3 1) reflection of Si and the chosen reflections of the heteroepitaxial layer at the expected position in the $Q_x$ direction include a (1 0 5) reflection of a Al1-xGaxN layer, wherein 0<x<1, and a (1 0 5) reflection of GaN.

8. The method of claim 6, wherein the substrate is Si and the chosen reflection is a (4 0 4) reflection of Si and the chosen reflections of the heteroepitaxial layer at the expected position in the $Q_x$ direction include a (2 0 4) reflection of the Al1-xGaxN layer, wherein 0<x<1, and a (204) reflection of GaN.

9. The method of claim 3, wherein generating the scan in the $Q_z$ direction comprises:

aligning the X-Ray source and the detector on a diffracted X-Ray peak at the expected position in the $Q_x$ direction which identifies the heteroepitaxial layer;

directing the incident X-Ray beam at the surface of the substrate while aligned at the expected position in the $Q_x$ direction, and moving the detector in the $Q_z$ direction so as to produce a diffracted X-Ray peak for the heteroepitaxial layer in the $Q_z$ direction.

10. The method of claim 9, further comprising moving the detector in $Q_z$ direction so as to produce a diffracted X-Ray peak for a further heteroepitaxial layer in the $Q_z$ direction.

11. The method of claim 10, wherein determining the concentration of the constituent element based on the scan in the $Q_z$ direction comprises:

identifying a position of the maximum of the scattered X-Ray peak in the $Q_z$ direction.

12. The method of claim 1, wherein the sample comprises a HEMT (high-electron mobility transistor) structure, and wherein the heteroepitaxial layer comprises an $Al_xGa_{(1-x)}N$ barrier layer which adjoins a GaN buffer layer.

13. The method of claim 12, wherein determining the concentration of the constituent element comprises:

identifying the maximum of a diffracted X-Ray peak in the $Q_z$ scan which corresponds to the $Al_xGa_{(1-x)}N$ barrier layer;

identifying the position of the maximum in the $Q_z$ direction;

calculating the lattice parameters from the position of the maximum, and calculating the composition based on a known relationship between x and the lattice parameters.

* * * * *